US011444964B2

(12) United States Patent
Sternby et al.

(10) Patent No.: US 11,444,964 B2
(45) Date of Patent: Sep. 13, 2022

(54) METHOD AND ARRANGEMENT FOR DETECTING ANOMALIES IN NETWORK DATA TRAFFIC

(71) Applicant: Telefonaktiebolaget LM Ericsson (publ), Stockholm (SE)

(72) Inventors: Jakob Sternby, Lund (SE); Vasileios Giannokostas, Sundbyberg (SE); Michael Liljenstam, Sunnyvale, CA (US); Erik Thormarker, Stockholm (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 643 days.

(21) Appl. No.: 16/431,122

(22) Filed: Jun. 4, 2019

(65) Prior Publication Data

US 2020/0389476 A1 Dec. 10, 2020

(51) Int. Cl.
*H04L 9/40* (2022.01)
*G06N 20/00* (2019.01)

(52) U.S. Cl.
CPC ......... *H04L 63/1425* (2013.01); *G06N 20/00* (2019.01)

(58) Field of Classification Search
CPC ............................................ H04L 63/14–1425
See application file for complete search history.

(56) References Cited

U.S. PATENT DOCUMENTS 11,057,409 B1 * 7/2021 Bisht .................. H04L 41/12
2003/0061228 A1   3/2003 Kamath et al.
(Continued)

FOREIGN PATENT DOCUMENTS

CN    109714343 A    5/2019
EP      3451219 A1    6/2019
WO   2017120519 A1   7/2017

OTHER PUBLICATIONS

PCT International Search Report, dated Jul. 21, 2020, in connection with International Application No. PCT/EP2020/063161, all pages.

(Continued)

*Primary Examiner* — Olugbenga O Idowu
(74) *Attorney, Agent, or Firm* — Leffler Intellectual Property Law, PLLC

(57) ABSTRACT

The present disclosure relates to a method and an apparatus for training a model for detecting anomalies in network data traffic between devices in a first part of a network and devices in a second part of the network. The method comprises collecting feature samples of network data traffic at a monitoring point between a first and a second part of the network, and training the model for detecting anomalies on the collected feature samples using a plurality of anomaly detection, AD, trees. The training comprises creating the plurality of AD trees using respective subsets of the collected feature samples, at least some of the AD tree comprising subspace selection nodes and anomaly-catching nodes to a predetermined AD tree depth limit. Each subspace selection node is arranged to bisect a set of feature samples reaching the subspace selection node to at least one anomaly-catching node when a number of feature samples leaving the subspace selection node for the at least one anomaly-catching node is below a predetermined threshold. The disclosure also relates to a method and an apparatus for anomalies in network data traffic using said model.

20 Claims, 6 Drawing Sheets

(56) References Cited

U.S. PATENT DOCUMENTS

2015/0304349 A1* 10/2015 Bernstein ............ H04L 63/1425
726/22
2018/0260531 A1* 9/2018 Nori ....................... G06N 7/005

OTHER PUBLICATIONS

PCT Written Opinion, dated Jul. 21, 2020, in connection with International Application No. PCT/EP2020/063161, all pages.
Liu, F.T., "Isolation Forest", 2008 Eighth IEEE International Conference on Data Mining, Dec. 15, 2008, Piscataway, NJ, USA, pp. 413-422.
Goix, Nicholas et al., "One Class Splitting Criteria for Random Forests", Proceedings of Machine Learning Research 77, 2017; arXiv.org, Nov. 7, 2016, Cornell University Library, Ithaca, NY, pp. 343-358.
Munir, Mohsin et al., "DeepAnT: A Deep Learning Approach for Unsupervised Anomaly Detection in Time Series", IEEE Access IEEE, USA, vol. 7, Jan. 7, 2019, pp. 1991-2005.
Krings, Gautier, "Why synthetic data is about to become a major competitive advantage", https://www.riaktr.com/synthetic-data-become-major-competitive-advantage/, date unknown, 3 pages.
Liu, F.T., "On Detecting Clustered Anomalies Using SCiForest", Joint European Conference on Machine Learning and Knowledge Discovery in Databases, 2010, 17 pages.
Pedregosa, F., et al., "Scikit-learn: Machine Learning in Python", Journal of Machine Learning Research 12, 2011, pp. 2825-2830.
Vanschoren, J., et al., "OpenML: networked science in machine learning", SIGKDD Explorations 15(2), 2013, pp. 49-60.
Zhang, Ya-Lin et al., "Anomaly Detection with Partially Observed Anomalies", The Web Conference 2018, 2018, 8 pages.

* cited by examiner

Performance

Performance

METHOD AND ARRANGEMENT FOR DETECTING ANOMALIES IN NETWORK DATA TRAFFIC

The present disclosure relates to a method and an apparatus for creating a model for detecting anomalies in network data traffic between devices in a first part of a network and devices in a second part of the network. The disclosure also relates to a method and an apparatus for detection of anomalies in network data traffic using said model.

BACKGROUND

In network security, it is often not possible to collect malicious data for detecting malicious network behaviour. For this reason, when constructing a system for automatic detection of malicious network behaviour, a method that does not rely on good representation of the malicious data is necessary. In machine learning, algorithms that do not rely on learning belong to a class "unsupervised learning" or "semi-supervised learning". One way to construct a system for detecting malicious network behaviour is to use such an algorithm, belonging to the class "unsupervised learning" or to the class "semi-supervised learning" for modelling the normal behaviour together with a function that describes how well a new instance fits to the existing modelling. This is called outlier or anomaly detection. Outlier and anomaly detection may also be used for the "semi-supervised learning", wherein only benign data is used for training.

One background art algorithm for such outlier or anomaly detection, AD, is the algorithm commonly denominated "Isolation Forest". This algorithm can be trained on both normal data interspersed with anomalies as well as clean data excluding anomalies, which would be the case when the anomalies are either unknown or unavailable, e.g., belonging to the classes of "unsupervised learning" or "semi-supervised learning". The "Isolation Forest" consists of constructing several isolation trees or iTrees, where each iTree is a decision tree fit to a random subset of the training data. Each tree is fit to the subset by successive random selection of a feature along with a split value. The split value is used to subdivide the sample set into two child trees. This process continues recursively until only one sample is left to construct a tree from—in which case the process stops, and the resulting endpoint is a leaf of the isolation tree. At an application stage, each sample will be passed through all trees using the same split values. By construction shorter paths correspond to indications of anomaly.

When conducting a training with the algorithm on a dataset that does not comprises any anomalies, this introduces a high risk of producing false positives since each leaf in the trees will have at least one corresponding training sample; thereby causing short paths on the training set. Thus, the method of fitting the iTrees to the data produces a forest that, by construction, is likely to produce some false positives when using it to detect anomalies.

Another weak point of the Isolation forest algorithm, is that the algorithm is restricted to isolate (create leaves in the tree) training samples. As a result, the algorithm does not apply as much weight to unexpected data points (unseen data) as could be possible and desirable. Furthermore, the current algorithm and its application contains no way of producing shorter paths for data unseen during the training process.

SUMMARY

It is an object of the present disclosure to solve or mitigate, alleviate, or eliminate at least some of the above mentioned deficiencies, disadvantages, and draw-backs of the background art solutions.

According to a first aspect, the object of the disclosure is achieved by a method for training a model for detecting anomalies in network data traffic between devices in a first part of a network and devices in a second part of the network. The method comprises collecting feature samples of network data traffic at a monitoring point between a first and a second part of the network, and training the model for detecting anomalies on the collected feature samples using a plurality of anomaly detection, AD, trees. The training comprises creating the plurality of AD trees using respective subsets of the collected feature samples, at least some of the AD tree comprising subspace selection nodes and anomaly-catching nodes to a predetermined AD tree depth limit. Each subspace selection node is arranged to bisect a set of feature samples reaching the subspace selection node to at least one anomaly-catching node when a number of feature samples leaving the subspace selection node for the at least one anomaly-catching node is below a predetermined threshold.

An advantage of the proposed method for training an anomaly detection model is that it reduces the risk for false positives also when conducting the training on a dataset without anomalies. The proposed method also enables attaching greater importance to feature samples having values deviating from a predetermined interval of values. Normality of training data is maximized at the same time as creating isolations also for unseen data. Additionally, for many datasets it increases the probability of creating leaves that catch anomalous feature values early in the tree—thus enabling higher anomaly scores for distinctly anomalous data points. As a special case of this it also enables catching anomalies in features displaying zero variance in the training set.

In some embodiments, each anomaly-catching node is arranged to be immediately followed by a terminating node.

In some embodiments, each anomaly-catching node is arranged to bisect the set of samples reaching the node to the terminating node, and to a subspace selection node or to an anomaly-catching node. The set of feature samples reaching the node are passed to the subspace selection node or the anomaly selection node.

Thus, splitting value outside the value span of the of the feature samples may be used; resulting in an improved ability to create isolation also for unseen data.

In some embodiments, each anomaly-catching node is followed by one or more further anomaly-catching nodes until reaching the AD tree depth limit D.

In some embodiments, the step of collecting feature samples is performed under anomaly transparent conditions. This provides the advantage of allowing modelling of normal network activity, e.g., network activities using clean data or with normal data interspersed with a subset of anomalies that are known a priori.

In some embodiments, the predetermined threshold represents a fraction determined from the number of feature samples leaving the subspace selection node for the at least one anomaly-catching node and the respective subset of collected feature samples.

In some embodiments, each subspace selection node is arranged to bisect the set of feature samples reaching the subspace selection node into two immediately following subspace selection nodes, when the size of the set of feature samples reaching the subspace selection node is on or above the predetermined threshold.

The key feature of the Anomaly Detection Forest lies in separating the bisecting, i.e., node-splitting process, into two different node types with more specialized assignments. For the anomaly-catching nodes, split values are chosen outside the feature span of the subsample arriving at the node.

According to a second aspect, the object of the disclosure is achieved by a method for detecting anomalies in network data traffic between devices in a first part of a network and devices in a second part of the network. The method comprises retrieving at least one network data traffic sample and determining an anomaly score using a model trained according to the method the above mentioned first aspect; the anomaly score representing an expected path length of the network traffic. Anomalies in the network data traffic sample are detected based on the determined anomaly score.

In addition to the above-reflected advantages associated with the modelling and training of the anomaly detection model, an advantage of determining an anomaly score using the model is a significant improvement in performance metrics, e.g., Area Under Curve, AUC, score values, as compared to background art anomaly detection methods. Thus, the proposed method allows a higher accuracy in detecting anomalies; also reducing the number of false positives to mitigate the well-known issue of "alert fatigue".

In some embodiments, the method for detecting anomalies in network data traffic comprises selecting at least one threshold value for detecting anomalies as a minimal value achieving an expected false/positive ratio on the samples used for modelling.

In some embodiments, the method for detecting anomalies in network data traffic comprises selecting at least one threshold value for detecting anomalies according to one or more previously observed limits for abnormality.

In some embodiments, the method for detecting anomalies in network data traffic comprises activating an alarm based on a comparison between the determined anomaly score and a predetermined threshold.

In some embodiments, the method for detecting anomalies in network data traffic comprises providing the alarm to a network function configured to control anomaly event handling in the network flow from one or more network devices in an external network to one or more network devices in an internal network.

According to a third aspect, the object of the disclosure is achieved by a computer program product comprising a non-transitory computer readable medium, having thereon a computer program comprising program instructions. The computer program is loadable into a data processing unit and configured to cause execution of the methods according to the above-recited first or second aspects when the computer program is run by the data processing unit.

According to a fourth aspect, the object of the disclosure is achieved by an apparatus for using an anomaly detection, AD, algorithm for detecting anomalies in network data traffic between devices in a first part of a network and devices in a second part of the network. The apparatus comprises processing circuitry configured to cause collection of feature samples of network data traffic between the first and second part of the network. The processing circuitry is further configured to cause training of an anomaly detection model on the collected feature samples using a plurality of AD trees. The training comprises creating the plurality of AD trees T using a subset of the collected feature samples, each AD tree comprising subspace selection nodes and anomaly-catching nodes to a predetermined AD tree depth limit D. Each subspace selection node is arranged to bisect a st of feature samples reaching the subspace selection node to at least one anomaly-catching node when a number of feature samples leaving the subspace selection node for the at least one anomaly-catching node is below a predetermined threshold.

In some embodiments, the apparatus further comprises traffic capturing circuitry for retrieving at least one network data traffic sample and processing circuitry arranged to determine an anomaly score for each based on the application of the trained anomaly detection model, and detecting anomalies in the network data traffic based on the determined anomaly score.

According to a fifth aspect, a server node comprising the apparatus of the fourth aspect achieves the object of the disclosure.

Advantages of any of the above disclosed aspects and embodiments comprise performance improvements in the capability of detecting anomalies, a reduced risk for false positives when conducting training on a dataset without anomalies and an ability to produce high anomaly scores also for anomalies in features that are very consistent in training data. Normality of training data is maximized at the same time as creating isolations also for unseen data.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating example embodiments.

DETAILED DESCRIPTION

Figure 1:
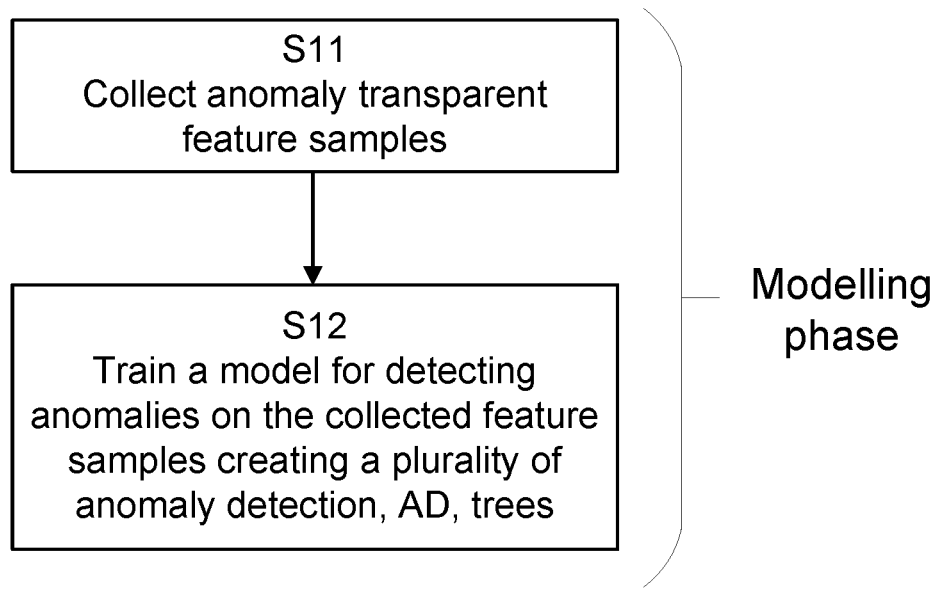
FIG. 1 shows a flowchart representation of a modelling phase for creating an Anomaly Detection Forest, ADF comprising Anomaly Detection, AD, trees.

Aspects of the present disclosure will be described more fully hereinafter with reference to the accompanying drawings. The methods and arrangements disclosed herein can, however, be realized in many different forms and should not be construed as being limited to the aspects set forth herein. Like numbers in the drawings refer to like elements throughout the disclosure.

It should be emphasized that the term "comprises/comprising", when used in this specification, is taken to specify the presence of stated features, integers, steps or components, but does not preclude the presence or addition or one or more other features, integers, steps, components or groups thereof. As used herein, the singular forms "a", "an", and "the" are intended to comprise the plural forms as well, unless the context clearly indicates otherwise.

When an arrangement is referred to herein, it is to be understood as a physical product or apparatus that may comprise one or more parts, such as processing circuitry in the form of one or more processors, one or more controllers, or the like.

In the context of the present disclosure, the terms "network traffic data", "traffic data", or "data" are used interchangeably, and refer to data with network flow properties, e.g., data from which mean/min/max of inbound and outbound data volumes as well as number of inbound and outbound connections and used ports may be extracted and used as features. The features may be aggregated using time windows so that each data point corresponds to a window in time. The network traffic data may be communicated between devices in a first part of a network and devices in a second part of the network. In the context of the present disclosure, it is to be understood that the first and second part may belong to the same network, e.g., a network under single operator control; but it is equally possible that the first and second part refer to different operator networks in an overall 3GPP network context, or any other type of network partitions that may be envisioned in a network capable of supporting network data traffic.

In the context of the present disclosure, the term "malicious" is used to refer to an activity of deliberate and disturbing nature.

Anomaly detection represents the problem of finding anomalies in a data set. In the context of the present disclosure, the term is also used to when referring to methods accomplishing anomaly detection, i.e., of learning characteristics of a data set in order to distinguish anomalous data points from normal data points following a training of an anomaly detection algorithm. In machine learning, algorithms that do not rely on learning belong to the class of "unsupervised learning" or "semi-supervised learning". One way to construct a system for detecting malicious behavior is to use such an unsupervised or semi-supervised learning algorithm for modelling the normal behavior together with a function that describes how well a new instance fits to the existing modelling. This is called outlier or anomaly detection and one algorithm for doing this is Isolation Forest. The Isolation Forest can be trained on both normal data interspersed with anomalies as well as clean data where anomalies are excluded (as when they are unknown or unavailable). Anomalies or outliers are considered as exceptions or oddities that do not conform to a normal or expected set of data. Outlier and anomaly detection may also be used for "semi-supervised learning", wherein benign data may be labelled and malicious data is unlabelled.

The Isolation Forest is an example of unsupervised learning wherein several isolation trees or iTrees are generated. Each iTree is a decision tree fit to a random training set of training data. Each tree is fit to the training set by successive random selection of a feature along with a split value. The split value is used to subdivide the training set into two child trees emanating from nodes in the isolation tree. This process continues recursively until only one sample is left to construct a tree from—in which case the process stops, and the resulting endpoint is a leaf of the isolation tree.

As previously mentioned, a weakness in the original method of training a model using isolation trees is that the algorithm by construction is restricted to isolate (create leaves in the tree) training samples. This does not give as much weight on unexpected data points (unseen data) as would be possible and leaves early in the iTree are most likely created by isolated training samples—other leaves are found deeper in the tree. In its most general form, the below disclosed solution addresses these weaknesses by introducing a concept of anomaly-catching nodes in addition to subspace selection nodes.

FIG. 1 shows a flowchart representation of a modelling phase for creating an Anomaly Detection Forest, ADF, comprising Anomaly Detection, AD, trees, according to the present disclosure. A method for training a model for detecting anomalies in network data traffic according to the present disclosure comprises collecting S11 feature samples of network data traffic at a monitoring point between a first and a second part of a network, and training S12 the model for detecting anomalies on the collected feature samples. The feature samples are collected from network data traffic between devices in the first part of a network and devices in the second part of the network, e.g., between internal network devices and external network devices, or between internal network devices. The network flows may originate from different device types such as IoT devices, computers, mobile phones or network equipment. Thus, network data traffic is exchanged in a physical layer between the first and second part of the network, e.g., over a radio interface in a wireless network.

The model is trained for detecting anomalies on the collected feature samples using a plurality of AD trees. The training comprises creating the plurality of AD trees using respective subsets of the collected feature samples, at least some of the AD tree comprising subspace selection nodes and anomaly-catching nodes to a predetermined AD tree depth limit. The ADF is designed to accentuate shorter path lengths for network traffic data with properties differing from the training set.

Each subspace selection node is arranged to bisect a set of feature samples reaching the subspace selection node. When a number of feature samples leaving the subspace selection node, i.e., used to create children nodes, is below a predetermined threshold it will be initialized as an anomaly-catching node. Anomaly-catching nodes are either terminating nodes or have two children where one is a terminating node, i.e., an anomaly leaf in the AD tree.

The proposed algorithm aims at maximizing the normality of training (seen) data whilst creating possible isolations for unseen data at the same time.

In some embodiments, each anomaly-catching node is arranged to be immediately followed by a terminating node. This allows the creation of empty leaves and a bisecting of the set of feature samples to only one branch in the tree structure, thereby avoiding a split of training subsamples below a certain threshold (isolation level).

In some embodiments, each anomaly-catching node is arranged to bisect the set of samples reaching the anomaly selection node to the terminating node, and to a subspace selection node or to an anomaly-catching node. The set of feature samples reaching the anomaly selection node are passed to the subspace selection node or the anomaly selection node.

Thus, a splitting value outside the value span of the of the feature samples may be selected; resulting in an improved ability to create isolation also for unseen data.

Thus, while values for splitting the subsample at a subspace selection node are chosen from within the interval of the feature samples, for the anomaly-catching nodes the splitting value can also be chosen from outside this interval. The value space of every feature is defined as the theoretical bounds for a feature, i.e., the interval of possible values for the feature:

$$V(f) = \{x_f | x \in X\} \quad [1]$$

where X is the true sample distribution. Typically, the V(f) can be {0, 1} for binary features or $N_0$ for natural numbers including 0 or any floating point number for continuous features.

In some embodiments, the random value ($\gamma$) for splitting the feature sample, subsample (S), with feature f with value space V(f), is picked from the interval such that the resulting two children nodes are within a certain size constraint E.

$$\gamma(S)_f \in \left[\gamma \in V(f) \text{ s.t.} \left|\frac{\#\{x_f < \gamma \mid x \in S\}}{\#S} - 0,5\right| < \varepsilon\right] \quad [2]$$

Consequently, during modelling, the subsample of a subspace selection node is arranged to be split evenly within an ε-margin. With ε approaching 0.5 the selection criterium is identical to a node in an isolation tree, i.e., a subspace selection node and no consideration is taken to resulting sizes. Thus, in some embodiments, each subspace selection node is arranged to bisect the set of feature samples reaching the subspace selection node into two immediately following subspace selection nodes, when the size of the set of feature samples reaching the subspace selection node is on or above the predetermined threshold.

Aiming to avoid isolation of the subsamples, a subspace selection node is bisected to a subspace selection node and an anomaly-catching node when the number of feature samples, i.e., the subset of the collected feature samples, passed to the anomaly-catching node is smaller than a determined threshold β, of the collected feature samples. The resulting node after bisecting a subspace selection node is designated to be an anomaly-catching node when the number of feature samples, i.e., the subset of collected feature samples passed to the node is smaller than the determined threshold β. The predetermined threshold may be set as an isolation level, a fraction determined from the number of fsamples used to build the tree. The E is a parameter regulating the balance of number of samples passed to each child of a subspace selection node and a smaller value of ε causes the bisected nodes to attain the critical size for becoming anomaly catching nodes at around the same depth. In the extreme case when ε is zero, every node is split evenly until the subsample size reaches β. However, with ε>0, this size will be reached after a varying number of steps of splitting.

In the anomaly-catching node the splitting value α is randomly chosen outside the value span $$\text{span}(S)_f = [\min(x_f), \max(x_f)]|_{x \in S} \quad [3]$$

of the chosen feature f for the sample set S in the node as:

$$\alpha(S)_f \in [\alpha \in V(f) \mid \alpha \notin \text{span}(S)_f] \quad [4]$$

V(f) may be updated for every parent node, i.e., subspace selection node, that splits on feature f.

The random choice of a splitting value outside the value span implies passing the subset of the collected feature samples to one side, e.g., to a subspace selection node, and creating an anomaly-catching node that may be terminated as an empty leave, i.e., terminating node, in the tree structure.

In some embodiments, each anomaly-catching node is followed by one or more further anomaly-catching nodes until reaching the AD tree depth limit D. The anomaly-catching nodes do not reduce the sample size, so for the tree creation process to terminate when stacking such, a depth limit D is imposed when constructing the tree.

A suitable depth limit D for this setup with subsample size n is:

$$D = \text{round}(4 * \max([1, \log(n) - \log(\beta)])) \quad [5]$$

During the modelling phase, the collected feature samples (training set) are collected under normal circumstances (without malicious activity). Thus, the step of collecting feature samples is performed under anomaly transparent conditions where anomalies may be modelled from samples of network data traffic between devices in the first part of the network and the second part of the network using clean data or with normal data interspersed with a subset of anomalies that are known a priori.

These samples are then used to train an Anomaly Detection Forest, ADF. The hyperparameters needed to be chosen for this training is the collected feature samples, subsample size n. In addition to the subsample size n for creating each Anomaly Detection Tree, the number of trees T must be chosen. For large datasets, such as network data, subsample size can be set to 256 and number of trees to 500. But for some datasets a small subsample size of 16 may also be sufficient. The order of subset selection nodes and anomaly-catching nodes also needs to be selected as well as the depth limit D and the hyperparameters ε and β described above. It is also possible to use an ensemble forest of trees initialized with different hyperparameters.

FIGS. 3A-D disclose experiments wherein comparisons are made between an isolation forest construction using an Area Under Curve, AUC, score on a Receiver Operating Characteristic, ROC, curve. The Anomaly Detection Forest described above significantly improves the AUC values compared to the original isolation forest algorithm. Since there is an inherent randomness in the construction of the Isolation Forest all performance metrics need to be averaged over several runs. The numbers shown below give the difference in mean of 10 runs on some different datasets commonly used for benchmarking anomaly detection. In the experiments, the tree construction started with subset selection nodes until the size of the sample set reaching each node was below 20% of the original subsample size (β=0.2*number of samples) and with ε=0.2. Thereafter anomaly-catching nodes were added until the depth limit, D, was reached.

After the Anomaly Detection Forest, ADF, is created the threshold value for detecting anomalies can be chosen as the minimal value achieving the expected false positive ratio on the samples used for modelling or according to previously observed limits for abnormality as described below.

Figure 2:
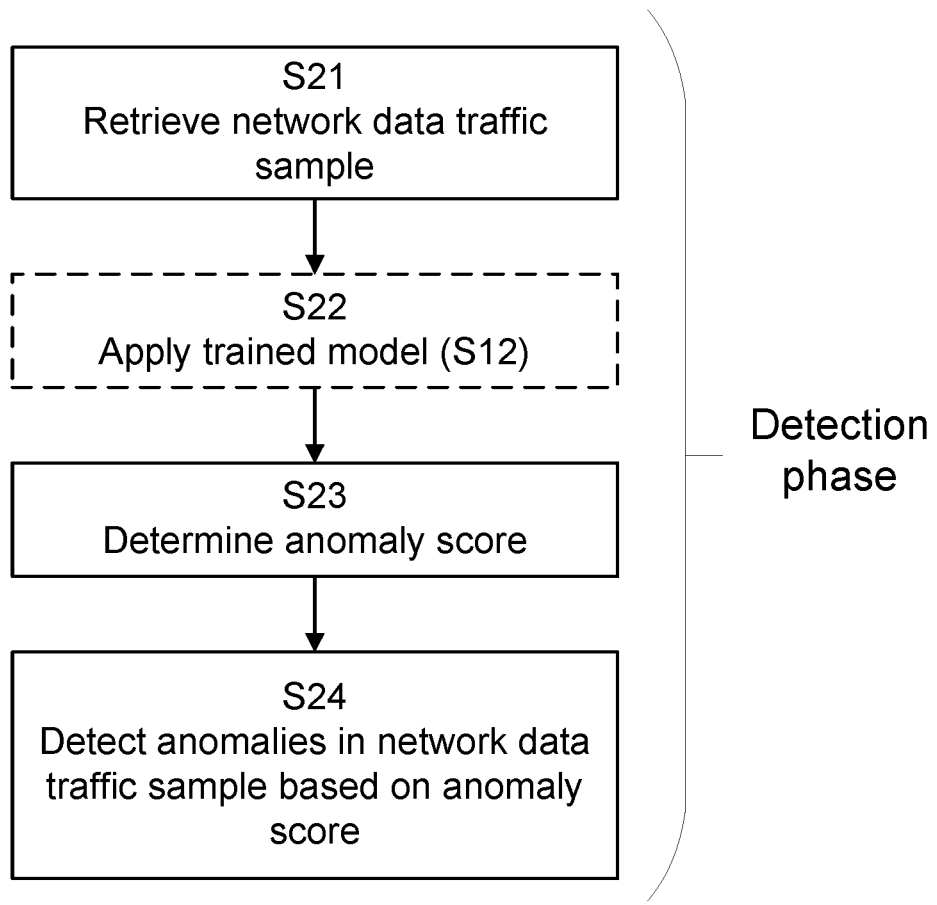
FIG. 2 shows a flowchart representation of a method for anomaly detection using the trained ADF.
Figure 3A:
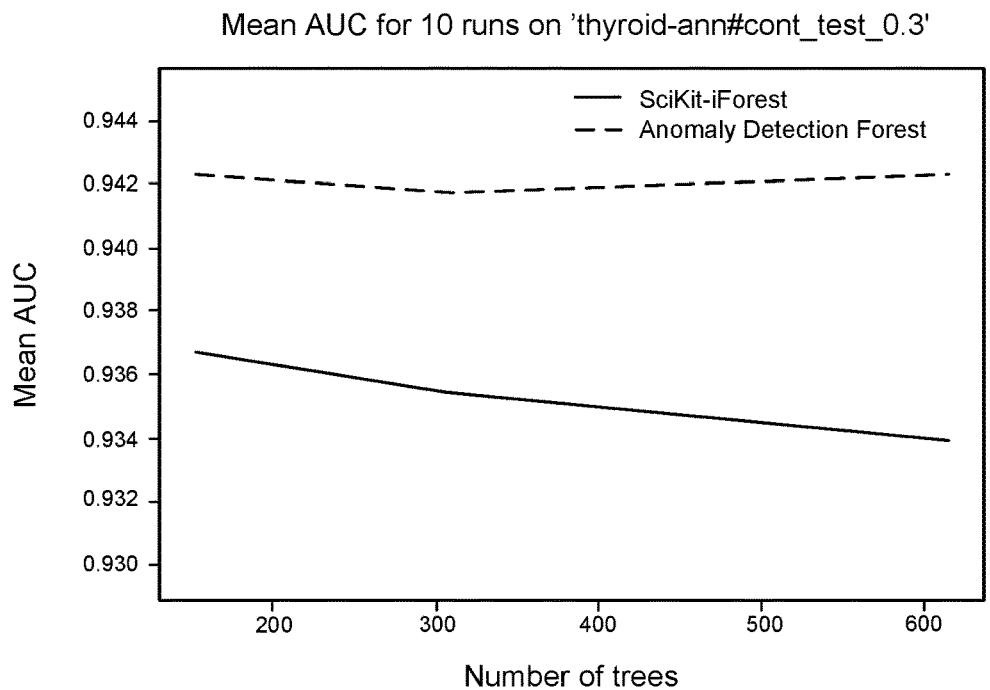
FIGS. 3A through 3D illustrate Area Under Curve, AUC, score performance characteristics for the original isolation forest algorithm and the herein proposed ADF implementation.
Figure 3B:
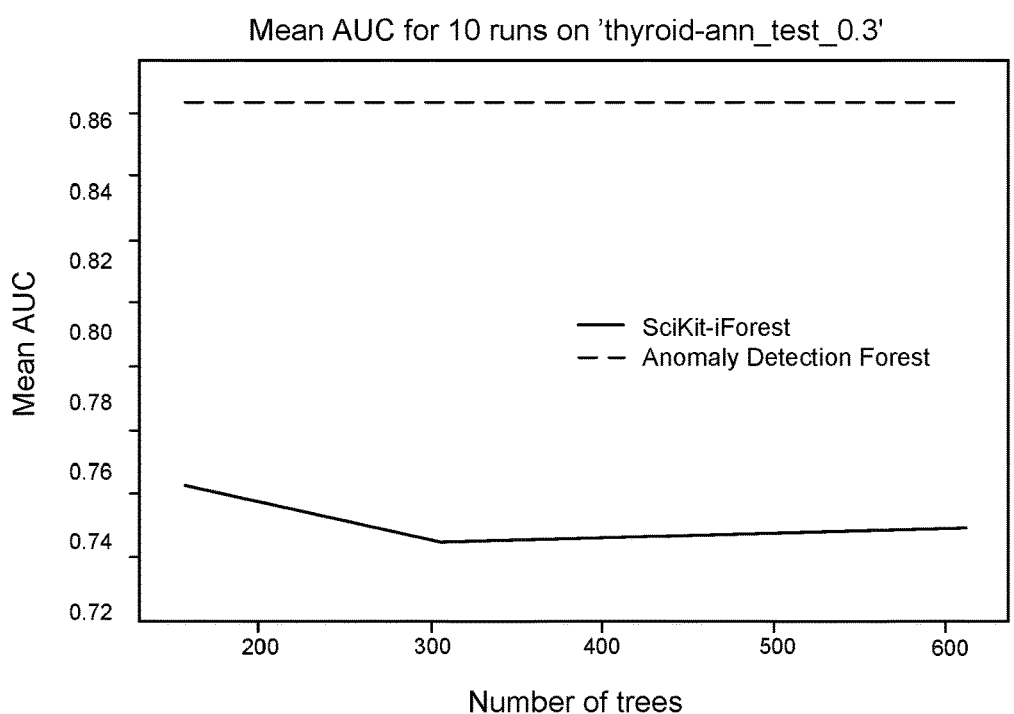
Figure 3C:
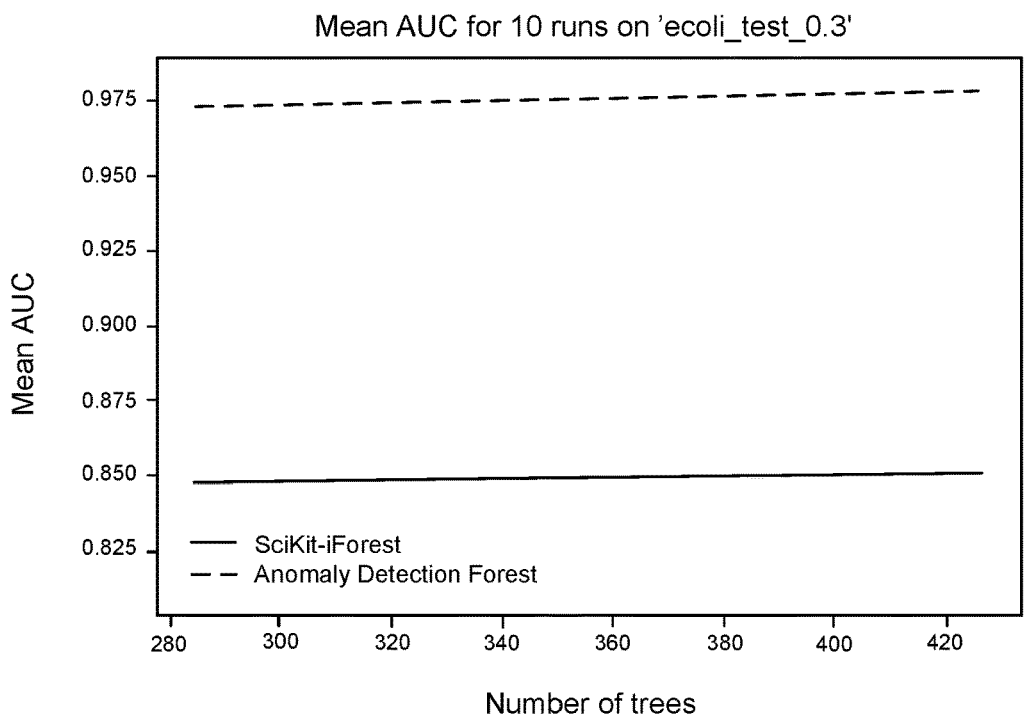
Figure 3D:
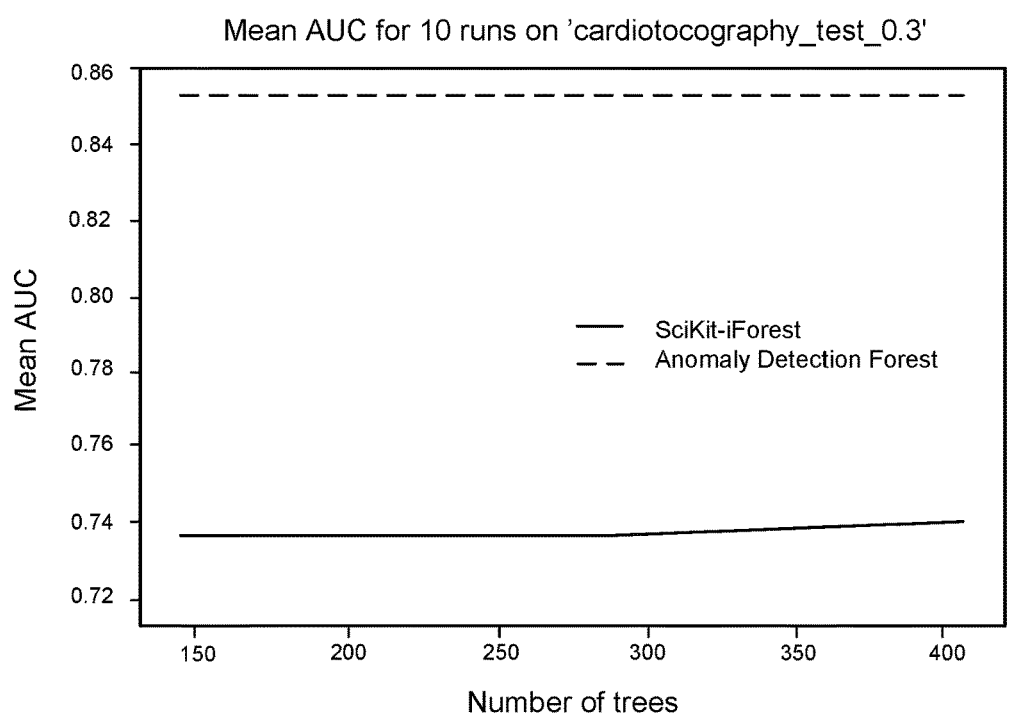

FIG. 2 shows a flowchart representation of a method for anomaly detection using the trained ADF, i.e., a method for detecting anomalies in network data traffic between devices in a first part of a network and devices in a second part of the network. The method comprises retrieving S21 at least one network data traffic sample and determining S23 an anomaly score applying S22 a model trained according to the method described with reference to FIG. 1; determining S23 the anomaly score representing an expected path length of the network traffic. Anomalies in the network data traffic sample are detected S24 based on the determined anomaly score.

The anomaly score indicating a degree of anomaly is obtained from application of modelled Anomaly Detection Forest. In some embodiments, the method for detecting anomalies in network data traffic comprises selecting at least one threshold value for detecting anomalies as a minimal value achieving an expected false/positive ratio on the samples used for modelling. In some embodiments, the method for detecting anomalies in network data traffic comprises selecting at least one threshold value for detecting anomalies according to one or more previously observed limits for abnormality.

The anomaly score includes a normalization constant c(n) that depends on the collected feature samples, i.e., the subsample size n. The expected path-length of a sample x through the forest is defined as:

$$E(h(x)) = \frac{1}{T}\sum_{t=1}^{T} h_t(x) \qquad [6]$$

where h_t (x) is the path length when passing sample x through Anomaly Detection Tree t. The path lengths of all used trees are weighted together as an Anomaly Score, AS, using an isolation score, IS, function:

$$IS(x) = 2^{-\frac{E(h(x))}{c(n)}} \qquad [7]$$

Scores below 0.3 may indicate normality, whereas scores above 0.3 may be set to indicate a degree of anomaly out of a normal range, but this depends on the normalization constant c(n).

As illustrated in FIGS. 3A-D, an advantage of determining an anomaly score applying the model presented in the description of FIG. 1, is a significant improvement in performance metrics, e.g., Area Under Curve, AUC, score values, as compared to background art anomaly detection methods, illustrated by SciKit-iForest AUC score values in FIGS. 3A-D. Thus, the proposed method allows a higher accuracy in detecting anomalies; also reducing the number of false positives to mitigate the well-known issue of "alert fatigue".

In some embodiments, the method for detecting anomalies in network data traffic comprises activating an alarm based on a comparison between the determined anomaly score and a predetermined threshold. In a typical implementation the program will activate an alarm for every sample that exceeds a predefined threshold for the anomaly score. This alarm can be received by another network function to take appropriate action, for instance, but not limited to alerting device owner and restricting device connectivity.

In some embodiments, the method for detecting anomalies in network data traffic comprises providing the alarm to a network function configured to control anomaly event handling in the network flow from one or more network devices in an external network to one or more network devices in an internal network.

Figure 4:
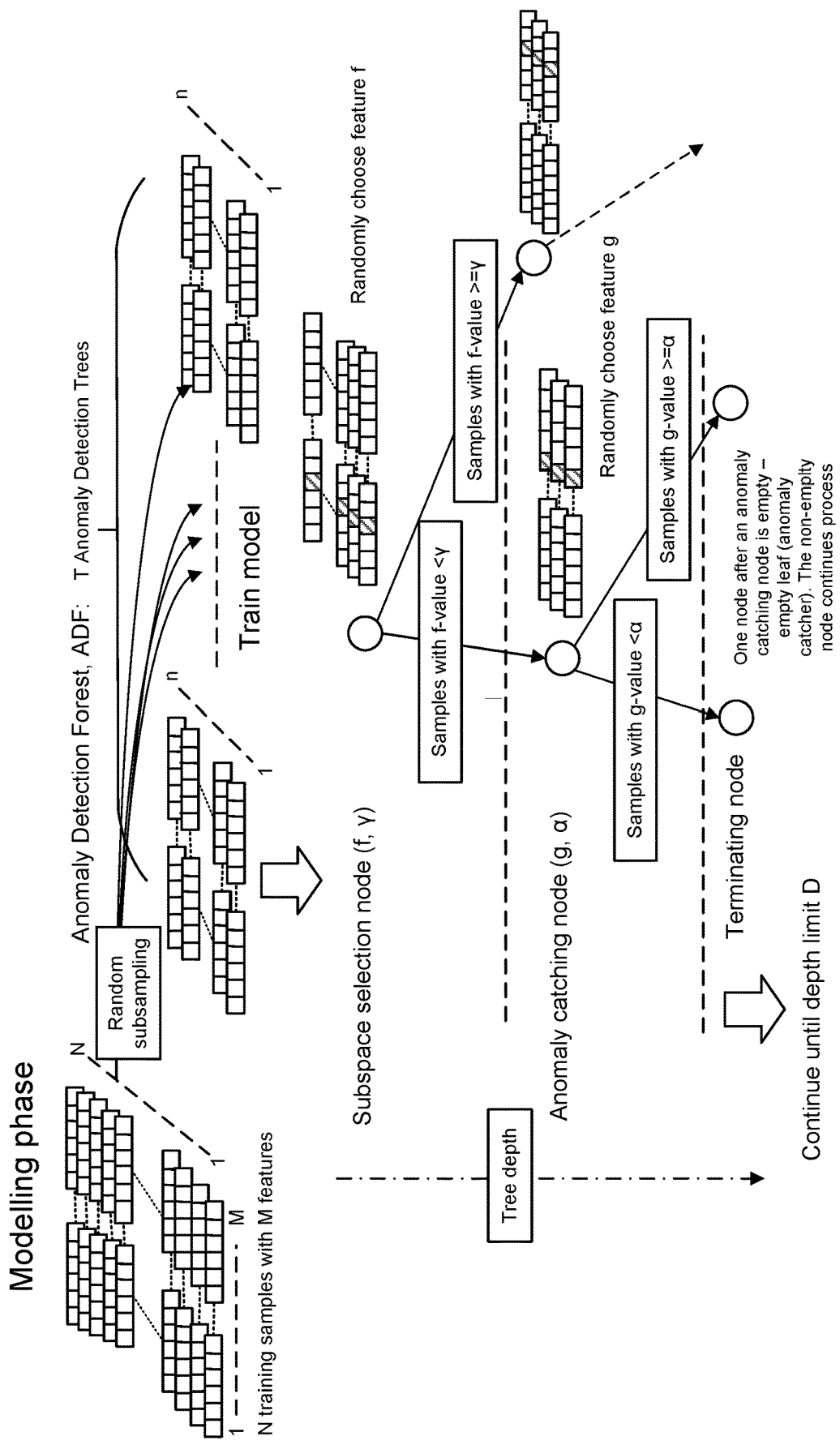
FIG. 4 schematically illustrates the ADF modelling phase.

FIG. 4 schematically illustrates an ADF modelling phase, i.e., an application of the method disclosed with reference to FIG. 1. Given a collection of feature samples N with M features, FIG. 4 discloses a method of modelling T Anomaly Detection Trees. For each tree, a random subset of the collected feature samples, i.e., n samples, is selected from the total set of N. Each AD tree is constructed by successively bisecting each node into child nodes that are either, subspace selection nodes, anomaly-catching nodes or terminating nodes (anomaly leaves). For both node types the feature to evaluate is randomly chosen among the M and the split values according to the rules for each node type. After an anomaly-catching node, a terminating node, i.e., an empty leaf, is created and only the non-empty node is used to create a new node. The process continues until the depth limit D is reached for the ADT.

Figure 5A:
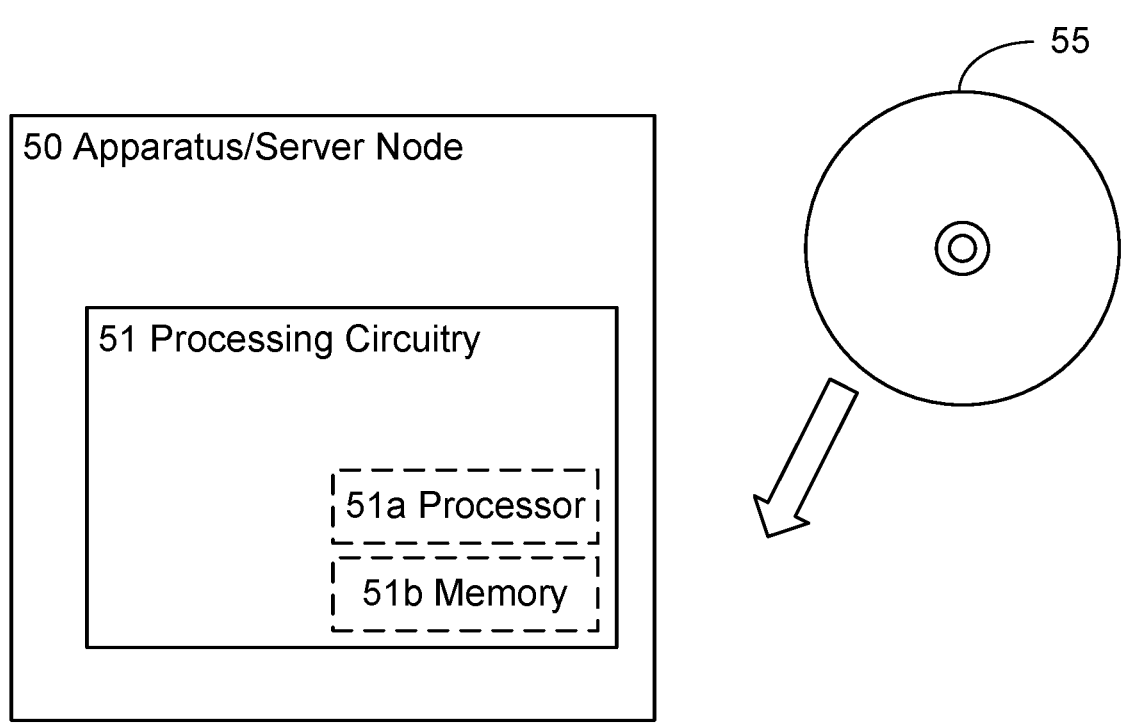
FIGS. 5A and 5B schematically illustrate aspects of an apparatus for modelling and detecting anomalies in network data traffic.

FIG. 5A, schematically illustrates aspects of an apparatus 50 for modelling and detecting anomalies in network data traffic, i.e., an apparatus 50 for using an anomaly detection algorithm to create a model for detecting anomalies in network data traffic between devices in a first part of a network and devices in a second part of the network, including devices within a same network. The apparatus may be comprised in a server node.

The apparatus comprises processing circuitry 51 configured to cause collection of feature samples of network data traffic between the first and second part of the network, e.g., by controlling a traffic capturer and training of an anomaly detection model on the collected feature samples using a plurality of AD trees. A computer program, carried on a computer readable medium 55 of a computer program product is loaded into the processing circuitry, e.g., in a memory 51b, and configured to cause execution of the methods when run by the processing circuitry 51, e.g., by the processor 51a.

The training comprises creating the plurality of AD trees T using a subset of the collected feature samples, each AD tree comprising subspace selection nodes and anomaly-catching nodes to a predetermined AD tree depth limit D. Each subspace selection node is arranged to represent a respective subspace sample S and is immediately followed by an anomaly-catching node when a size β of the subspace sample is below a predetermined threshold and the anomaly-catching node is arranged to be immediately followed by a terminating node. Thus, each node in the AD tree is associated to a node training subsample S and is designated to be an anomaly-catching node when the size of S is below a predetermined threshold β (isolation level). Anomaly-catching nodes are either terminating nodes or have two children where one is a terminating node, i.e., an anomaly leaf. The modelled group of AD tree form an Anomaly Detection Forest, ADF.

Thus, during the modelling phase the extracted features are collected and at the end of the phase they are used to train an Anomaly Detection Forest. In the detection phase, an anomaly score is calculated with the Anomaly Detection Forest for each sample.

Figure 5B:
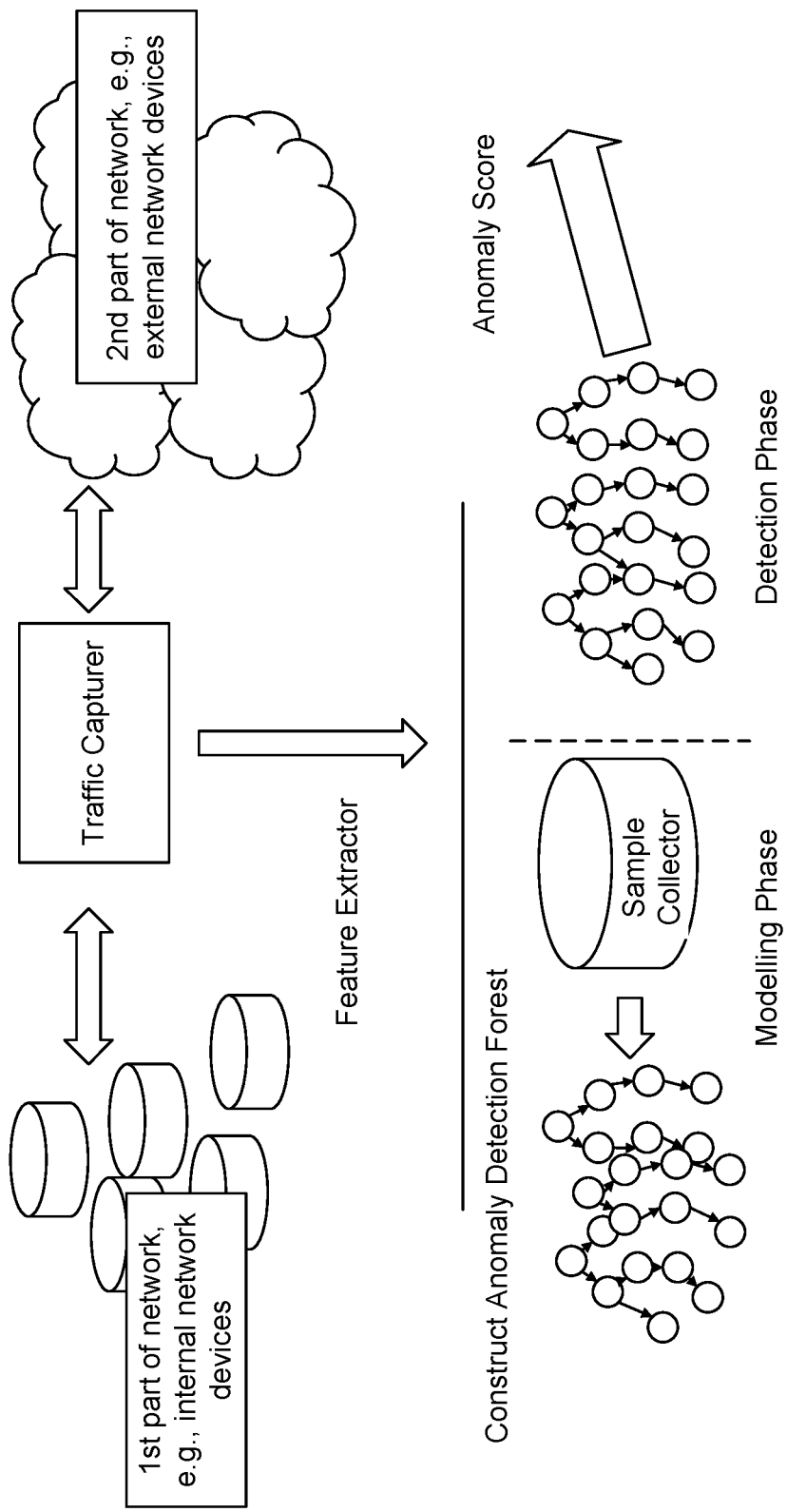

Turning to FIG. 5B, aspects of an embodiment comprising a traffic capturing circuitry is disclosed. The traffic capturing circuitry is controlled to retrieve at least one network data traffic sample, that is processed by the processing circuitry to determine an anomaly score for each based on the application of the trained anomaly detection model, and detecting anomalies in the network data traffic based on the determined anomaly score.

In some embodiments, the apparatus is configured for providing the alarm to a network function configured to control anomaly event handling in the network flow from one or more network devices in an external network to one or more network devices in an internal network.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of source nodes, target nodes, corresponding methods, and computer program products. It should be appreciated that the example embodiments presented herein may be practiced in combination with each other.

The invention claimed is:

1. A method for creating a model for detecting anomalies in network data traffic between devices in a first part of a network and devices in a second part of the network, the method comprising:
collecting feature samples of network data traffic at a monitoring point between a first and a second part of the network, and
training the model for detecting anomalies on the collected feature samples using a plurality of anomaly detection, AD, trees;
wherein training comprises creating the plurality of AD trees using respective subsets of the collected feature samples, at least some of the AD tree comprising subspace selection nodes and anomaly-catching nodes to a predetermined AD tree depth limit D, wherein each subspace selection node is arranged to bisect a set of feature samples reaching the subspace selection node based on a value chosen from within a first interval that is an interval of the set of feature samples reaching the subspace selection node and each anomaly-catching node is arranged to bisect a set of feature samples reaching the anomaly-catching node based on a value chosen from a second interval that includes one or more values outside the first interval, and wherein each subspace selection node is arranged to bisect a set of feature samples reaching the subspace selection node to at least one anomaly-catching node when a number of feature samples leaving the subspace selection node for the at least one anomaly- catching node is below a predetermined threshold.

2. The method of claim 1, wherein each anomaly-catching node is arranged to be immediately followed by a terminating node.

3. The method of claim 1, wherein each anomaly-catching node is arranged to bisect the set of samples reaching the anomaly-catching node to the terminating node and to a subspace selection node or to a further anomaly-catching node, and wherein the set of feature samples reaching the anomaly-catching node are passed to the subspace selection node or the further anomaly-catching node.

4. The method of claim 2, wherein each anomaly-catching node is followed by one or more further anomaly-catching nodes until reaching the AD tree depth limit D.

5. The method of claim 1, wherein the step of collecting feature samples is performed under anomaly transparent conditions.

6. The method of claim 1, wherein the predetermined threshold represents a fraction determined from the number of feature samples leaving the subspace selection node for the at least one anomaly-catching node and the respective subset of collected feature samples.

7. The method of claim 1, wherein each subspace selection node is arranged to bisect the set of feature samples reaching the subspace selection node into two immediately following subspace selection nodes, when the size of the set of feature samples reaching the subspace selection node is on or above the predetermined threshold.

8. The method of claim 7, wherein the set of feature samples reaching the subspace selection node is bisected to two immediately following subspace selection nodes under a size constraint E.

9. The method of claim 8, wherein the set of training samples, S, with values for feature f in span($S_f$)=[min $x_f$, max $x_f$], x in S, reaching the subspace selection node is bisected within the size constraint ε:

$$\gamma(S)_f \in \left[ \gamma \in V(f) \text{ s.t.} \left| \frac{\#\{x_f < \gamma \mid x \in S\}}{\#S} - 0,5 \right| < \varepsilon \right],$$

wherein:
$\gamma(S)_f$ is a value for splitting the training samples for feature f that reach the subspace selection node;
V(f) is a value space for feature f;
γ is a value in V(f); and
S is a size of the set of training samples, S.

10. The method of claim 1, further comprising selecting the predetermined AD tree depth limit D:

$$D = \text{round}(4 * \max([1, \log(n) - \log(\beta)])),$$

wherein n is a subsample size and β is the predetermined threshold.

11. A method for detecting anomalies in network data traffic between devices in a first part of a network and devices in a second part of the network, the method comprising:
retrieving at least one network data traffic sample;
determining an anomaly score using an Anomaly Detection Forest, ADF, model trained according to the method of claim 1 by determining an expected path length in the ADF of the network traffic; and
detecting anomalies in the network data traffic sample based on the determined anomaly score.

12. The method of claim 11, wherein the anomaly score is determined using an Isolation Score function:

$$IS(x) = 2^{-\frac{E(h(x))}{c(n)}}$$

wherein an expected path-length of a sample x through the plurality of AD trees is defined as:

$$E(h(x)) = \frac{1}{T} \sum_{t=1}^{T} h_t(x),$$

wherein c(n) is a normalization constant that is a function of a subsample size n, and $h_t(x)$ is a path length when passing sample x through an Anomaly Detection Tree t.

13. The method of claim 11, further comprising selecting at least one threshold value for detecting anomalies as a minimal value achieving an expected false/positive ratio on the samples used for modelling.

14. The method of claim 11, further comprising selecting at least one threshold value for detecting anomalies according to one or more previously observed limits for abnormality.

15. The method of claim 11, further comprising activating an alarm based on a comparison between the determined anomaly score and a predetermined threshold.

16. The method of claim 15, further comprising providing the alarm to a network function configured to control anomaly event handling in the network flow from one or more network devices in an external network to one or more network devices in an internal network.

17. A non-transitory computer readable medium, having thereon a computer program comprising program instructions, the computer program being loadable into a data processing unit and configured to cause execution of a method when the computer program is run by the data processing unit, wherein the method is for creating a model for detecting anomalies in network data traffic between devices in a first part of a network and devices in a second part of the network, and wherein the method comprises:
  collecting feature samples of network data traffic at a monitoring point between a first and a second part of the network, and
  training the model for detecting anomalies on the collected feature samples using a plurality of anomaly detection, AD, trees;
  wherein training comprises creating the plurality of AD trees using respective subsets of the collected feature samples, at least some of the AD tree comprising subspace selection nodes and anomaly-catching nodes to a predetermined AD tree depth limit D, wherein each subspace selection node is arranged to bisect a set of feature samples reaching the subspace selection node based on a value chosen from within a first interval that is an interval of the set of feature samples reaching the subspace selection node and each anomaly-catching node is arranged to bisect a set of feature samples reaching the anomaly-catching node based on a value chosen from a second interval that includes one or more values outside the first interval, and wherein each subspace selection node is arranged to bisect a set of feature samples reaching the subspace selection node to at least one anomaly-catching node when a number of feature samples leaving the subspace selection node for the at least one anomaly-catching node is below a predetermined threshold.

18. An apparatus for creating a model for detecting anomalies in network data traffic between devices in a first part of a network and devices in a second part of the network, the apparatus comprising processing circuitry configured to cause:
  collection of feature samples of network data traffic between the first and second part of the network; and
  training of an anomaly detection model on the collected feature samples using a plurality of anomaly detection, AD, trees,
  wherein training comprises creating the plurality of AD trees T using a subset of the collected feature samples, at least some of the AD trees comprising subspace selection nodes and anomaly-catching nodes to a predetermined AD tree depth limit D, wherein each subspace selection node is arranged to bisect a set of feature samples reaching the subspace selection node based on a value chosen from within a first interval that is an interval of the set of feature samples reaching the subspace selection node and each anomaly-catching node is arranged to bisect a set of feature samples reaching the anomaly-catching node based on a value chosen from a second interval that includes one or more values outside the first interval, and wherein each subspace selection node is arranged to bisect a set of feature samples reaching the subspace selection node to at least one anomaly-catching node when a number of feature samples leaving the subspace selection node for the at least one anomaly-catching node is below a predetermined threshold.

19. The apparatus of claim 18, further configured to cause:
retrieval at least one network data traffic sample;
application of the trained anomaly detection model;
determination of an anomaly score based on the application of the trained anomaly detection model; and
detection of anomalies in the network data traffic based on the determined anomaly score.

20. A server node comprising one or more of the apparatus according to claim 18.

* * * * *